United States Patent [19]

Johnson et al.

[11] Patent Number: 4,723,831

[45] Date of Patent: Feb. 9, 1988

[54] OPTICAL FIBER COMMUNICATIONS CABLE

[75] Inventors: Brian D. Johnson, Norcross; William C. Reed, Lilburn; Carla G. Wilson, Decatur, all of Ga.

[73] Assignees: American Telephone and Telegraph Company AT&T Bell Laboratories, Murray Hill; AT&T Technologies, Inc., Berkeley Heights, both of N.J.

[21] Appl. No.: 803,628

[22] Filed: Dec. 2, 1985

[51] Int. Cl.$^4$ .............................................. G02B 6/44
[52] U.S. Cl. .................................................. 350/96.23
[58] Field of Search ..................................... 350/96.23

[56] References Cited

U.S. PATENT DOCUMENTS

| 4,009,932 | 3/1977 | Ferrentino | 350/96.23 |
| 4,078,853 | 3/1978 | Kempf et al. | 350/96.23 |
| 4,241,979 | 12/1980 | Gagen et al. | 350/96.23 |
| 4,457,583 | 7/1984 | Mayr et al. | 350/96.23 |
| 4,534,618 | 8/1985 | Brüggendieck | 350/96.23 |

FOREIGN PATENT DOCUMENTS

| 2817045 | 11/1978 | Fed. Rep. of Germany | 350/96.23 |
| 1568178 | 5/1980 | United Kingdom | 350/96.23 |

OTHER PUBLICATIONS

*Review of the Electrical Communication Laboratories*, vol. 32, No. 4, 1984, "Design and Performance of Optical Drop and Indoor Cables" by S. Kukita et al., pp. 636–645.

*Fiberoptics for Telecommunications* (VALTEC), product brochure, 4 pp., Nov. 1982.

*Siecor/Optical Cable* (SIECOR), product brochure, 7 pp., Jul. 1981.

*Fiber Optic Cables* (TFC), product brochure, 6 pp., Jun. 1984.

Primary Examiner—John Lee
Attorney, Agent, or Firm—Eugen E. Pacher

[57] ABSTRACT

An optical fiber cable includes a first jacket, typically comprising a polyvinyl chloride material, a core member comprising at least one, typically $\leq 10$, optical fiber(s), and a core wrap loosely surrounding the optical fiber(s). The optical fiber(s) typically is (are) slightly overstuffed. The cable further comprises three non-metallic strength members (or groups of strength members) completely embedded in the first jacket and coupled thereto. In cables containing three strength members, the coupling is typically characterized by a pull-out strength of at least 25, preferably more than 40, lbs/in of strength member. Each strength member comprises a multiplicity of impregnated filaments, preferably borosilicate glass filaments impregnated with a urethane. The preferred cable typically has a circularly symmetric cross section, with the three strength members, each of radius $r_s$, disposed longitudinally, their axes a distance R from the axis of the first jacket, with $R > 1.155(r + r_s)$ where r is the inner radius of the first jacket. In one embodiment of the invention, the voids between the optical fiber(s) and the core wrap is filled with a filling compound, e.g., a fire retardant grease composition. In another embodiment, the cable further comprises a metal member, e.g., a steel tape, that contactingly surrounds the first jacket, and a plastic, e.g., polyvinyl chloride, outer jacket that contactingly surrounds the metal member. The cable can advantageously be used in the local distribution network, including in external plant applications such as distribution or buried service cable, and indoor applications such as riser or plenum cable.

17 Claims, 3 Drawing Figures

OPTICAL FIBER COMMUNICATIONS CABLE

BACKGROUND OF THE INVENTION

Optical fiber is finding increasing application in long-haul signal transmission, and many cable designs have been proposed or are available commercially. See, for instance, U.S. Pat. Nos. 4,078,853 and 4,241,979, coassigned with this.

Recently it has become apparent that optical fiber not only can advantageously be used as a long-haul (e.g., inter-city) transmission medium but potentially can also be used economically in the local distribution network (exemplarily including distribution, service or drop, and indoor cable), thus opening the possibility of end-to-end optical communications. However, the optical fiber cables that were designed for long-haul applications are typically not well suited for use in the local distribution network. For instance, such cables typically are designed to have medium to high fiber count (>10 fibers), are frequently relatively rigid and have a relatively large bending radius, and tend to be relatively costly to manufacture. On the other hand, cable for use in the local distribution plant typically requires only low fiber count (e.g., ≦10 fibers), should be flexible, have a small bending radius, be usable in a variety of environments, be deployable by existing means e.g., by means of vibratory plough or by trenching, and advantageously be easy to manufacture.

The prior art does know several optical fiber cables that are designed for use in the local distribution network. For instance, S. Kukita et al, *Review of the Electrical Communications Laboratories*, Volume 32(4), pp. 636-645 (1984) review the design and performance of optical drop and indoor cables, and disclose, inter alia, an indoor cable comprising a coated fiber surrounded by a PVC sheath, with four steel wires embedded in the sheath. Such a design can be expected to have some shortcomings, including a need for electrically grounding the steel wires, and difficulty in achieving good coupling between the sheath and the steel wires, and may cause bending-induced stresses on the optical fiber.

An exemplary commercially available optical fiber cable that can find use in local distribution plant comprises a central (steel or polymer) strength member surrounded by a polyurethane jacket, a multiplicity of fiber-containing loose tubes stranded around the polyurethane jacket, polyester tape and a polyethylene inner jacket surrounding the tubes, and steel or Al armor and a polyethylene outer jacket surrounding the inner jacket. In such a structure the fibers cannot be on the neutral axis of the cable when the cable is bent, requiring stranding of the loose tubes, which in turn complicates manufacture. Furthermore, in such a design the strength member is not well coupled to the outside jacket.

Another commercially available optical fiber cable for use in the local distribution network has a core consisting of a central coated steel wire strength member and a multiplicity of polymer tubes arranged around the central strength member, each tube containing one buffered optical fiber as well as a moisture resistant filling compound. This core is surrounded by aramid yarn which is said to take up the greater part of any tensile load applied to the fiber. The yarn layer in turn is surrounded by a polyethylene jacket. Thus constituted cables are said to be useful as aerial or duct cable. In cable for direct burial, a polyurethane inner jacket takes the place of above referred to polyethylene jacket, and steel tape armoring and a polyethylene outer jacket surround the inner jacket.

In this cable structure too, the fibers cannot be on the neutral axis of the cable when the cable is bent, thus also requiring stranding of the loose tubes. Furthermore, axial stresses are poorly coupled from the outer surface of the cable to the central strength member.

Still another family of commercially available optical fiber cables for use in the local distribution network contains cables of the "loose tube" type in which one or more optical fibers are loosely surrounded by polyethylene or PVC jacket, the voids within the thus formed loose tube being filled with polymeric gel. Two aramid fiber or steel strength members are embedded in the jacket, thereby defining the neutral plane for bending. The cables are available with flame retardant jackets.

Among the drawbacks of such a design is the fact that bending of the cable will frequently cause it to undergo a substantial amount of twist. Furthermore, it is expected that in this design fibers and filling compound are exposed to relatively high temperatures during cable manufacture. In such a design, it may occur that vinyl-buffered fibers (a currently frequently used fiber type) may fuse to the PVC jackets.

Co-assigned U.S. patent application Ser. No. 770,041, filed Aug. 28, 1985, (now abandoned) discloses, inter alia, an optical fiber drop cable in which a plurality of optical fibers is loosely surrounded by impregnated glass tape, and a polymer jacket of generally rectangular cross section is disposed such that the fiber-containing core is located at the center of the cross section. Impregnated filaments (e.g., glass or aramid filaments) are gathered to form two strength members which are embedded in the polymer jacket and coupled thereto. This design too has one predetermined neutral plane in bending, and thus can be bent in only one plane.

In view of the desirability of the ability to provide an optical fiber transmission path onto customer premises, an optical fiber cable that can be easily adapted for indoor (including flame retardant, riser and plenum cable) as well as for outdoor use (drop cable or distribution cable, unarmored or armored, including rodent-resistantly armored), that is of small diameter, highly flexible, crush resistant as well as resistant to tensile loading, that can be terminated easily and conveniently, and that is easy to manufacture, would be of considerable interest. This application discloses such an optical fiber cable.

SUMMARY OF THE INVENTION

The optical fiber communications transmission cable according to the invention comprises a core member, a first jacket surrounding the core member, and three groups of non-metallic strength members (each "group" comprising one or more strength members) completely embedded in the first jacket and coupled thereto.

The optical fiber cable is basically of the "loose tube" type, with the core member comprising a first member, typically a core wrap, preferably impregnated woven fiberglass, that loosely surrounds one, two, or more, typically no more than 10, optical fibers. For some applications of the cable, the voids between the optical fiber(s) and the core wrap are substantially filled with a filling compound. For indoor use the cable advantageously contains only flame retardant materials. The optical fiber(s) typically are "overstuffed", i.e., in any length $l_c$ of cable, the length $l_g$ of any optical fiber in the cable is greater than $l_c$ by some small amount.

The core member is surrounded by the first jacket, with the jacket typically not being coupled to the core member to a substantial degree. The longitudinal axis of the first jacket typically substantially coincides with the longitudinal axis of the core member, and the first jacket preferably has substantially circular cross section. Each one of the strength members embedded in the first jacket includes a multiplicity of filaments that are assembled together to form a roving or yarn, the filaments having been impregnated with a material that is compatible with that of the first jacket, resulting in substantial coupling between the first jacket and the strength members embedded therein.

The strength members are disposed in a generally longitudinal direction between the core member and the outer surface of the first jacket, substantially equidistant from, and symmetrical with respect to, the axis of the first jacket. Use of three strength members (or groups of strength members) disposed around the core member results in particularly advantageous cable characteristics. For instance, if the cable is bent, there will always be two strength members (or group thereof) in tension and one in compression. This results in a reduction of tensile strength in the bent configuration by only ⅓, as compared to ½ (or nearly ½) for four or more unstranded strength members (or groups thereof). Furthermore, the geometry of the inventive cable assures that any tensile fiber strain will always be less than the tensile strain of the stress members that are under tension.

The inventive cable can further comprise metallic (e.g., stainless steel) armoring surrounding the first jacket, surrounded by a polymer outer jacket. In this embodiment the invention is suitable for deployment by plowing, trenching, pulling into conduits, or other mechanical methods. The armoring can, for instance, be longitudinally applied corrugated plain or Cu-clad stainless steel strip, or helically applied flat plain or Cu-clad stainless steel tape. The outer jacket and the armoring are advantageously applied such that they are mechanically coupled to the first jacket. This assures that longitudinal stresses that act on the outer surface of the outer jacket are transmitted to, and substantially borne by, the strength members.

DETAILED DESCRIPTION OF THE PREFERRED EMBODIMENT

Figure 1:
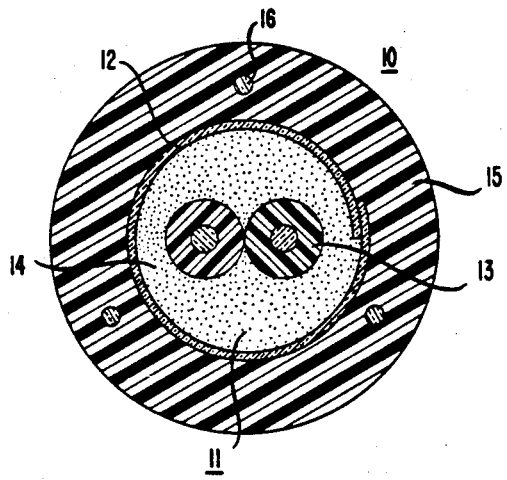
FIGS. 1, 2 and 3 show, in cross section, exemplary cables according to the invention.

In FIG. 1 is shown a cable 10 according to the invention, comprising a core member 11 that contains two optical fibers 13. The fibers can be of any desired fiber type, multimode or single mode, buffered or unbuffered, glass or plastic, silica-based or nonsilica-based glass lightguide. Currently, polymer coated silica-based multimode and single mode fibers are widely used in optical fiber telecommunications, and a currently preferred embodiment of the invention contains two coated and buffered silica-based fibers. Such fibers are well known and require no detailed discussion.

The fibers are loosely surrounded by core wrap 12, exemplarily a longitudinally disposed strip of woven fiber glass. In a preferred embodiment, the woven strip is impregnated with a polymer, e.g., polytetrafluoroethylene. Such core wrap material is available, inter alia, under the designation FLOROGLASS from Oak Materials Corp., Hoosick Falls, N.Y. The core wrap loosely surrounds the fibers such that the long sides of the core wrap strip overlap, thereby completely enclosing the fibers.

In some embodiments of the invention, the voids between the fibers and the core wrap are substantially filled with a fiber optical filling compound, e.g., a fire retardant grease composition consisting of about 5% by weight of hydrophobic fumed silica and about 95% by weight of a chlorinated paraffin oil. The filling compound leaves the fibers substantially free to move under applied stresses. In preferred embodiments, the filling compound advantageously fills essentially all voids within the core wrap, thereby serving to exclude water from the core.

The core member 11 is contactingly surrounded by a first jacket 15. The first jacket comprises plastic material which, in a preferred embodiment, comprises polyvinyl chloride (PVC). For at least some applications of the inventive cable, it is desirable that the PVC be semi-rigid, so as to result in a structure having a relatively high resistance to radial compression. The first jacket cross section typically has circular symmetry, with the longitudinal axis of the first jacket substantially coinciding with the longitudinal axis of the core member.

Figure 3:
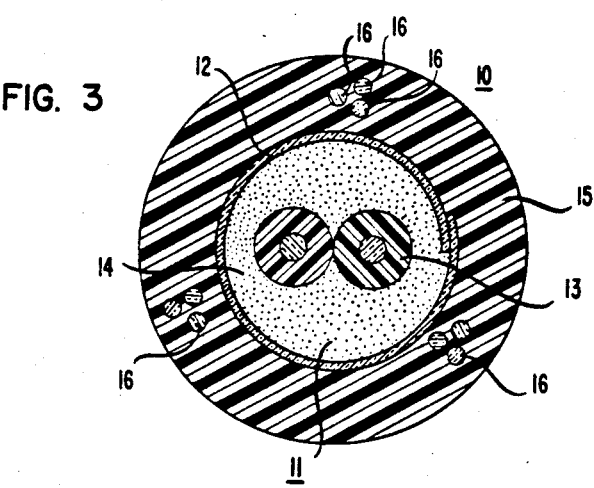

Embedded in first jacket 15 are three non-metallic strength members 16. Although embodiments with three strength members are particularly advantageous and are preferred, the invention is not so limited. Thus, in general, cable according to the invention contains three groups of strength members, each "group" comprising 1, 2, 3, or even more individual spaced-apart strength members, as exemplified in FIG. 3. Each strength member 16 comprises a fibrous strand material which is impregnated with a polymeric material, in the form of a plurality of filaments which are gathered together into one or more rovings or yarns. The filaments may comprise an inorganic material such as fiberglass or an organic material such as KEVLAR® aramid fiber. In a preferred embodiment, the strength members 16 are comprised of a plurality of E-glass fibers. E-glass fibers comprise a borosilicate glass composition, with the fibers having a minimum tensile strength of 200,000 psi. In an exemplary preferred embodiment, each strength member comprises 2 rovings, each roving comprising about 2,000 fibers. Although the strength member cross section will frequently be substantially circular, we also envisage non-circular, e.g., ribbon-like, strength members.

Optical fiber cables of the type discussed herein may be subjected to substantial tensile forces during deployment and/or during service. Since optical fibers generally can sustain only limited tensile loads before breaking, and since their optical loss increases with strain, it is an object of the invention to provide a cable design in which the fibers are substantially decoupled from tensile stresses applied to the outside of the cable. Aspects of the invention that contribute to achievement of this objective are the presence of substantial coupling between the first jacket and the strength members embedded therein, and low coupling between the first jacket and the core wrap.

Not only must the strength members 16 be suitably adhered to the first jacket 15, they must also have suitable strength characteristics to prevent failure under load. Load failure (e.g., in riser cable, or during placement of buried cable) is caused by filament abrasion, flaws and tensile load imbalance. Filaments can be abraded by neighboring filaments in the strength member and by particles in the jacket 15. Uneven sharing of the tensile load results when the filaments are not coupled to share tensile loads evenly. As some filaments break, others accept the load until the total cross section of the strength member fails.

Coupling of the strength members to the first jacket, and resistance to failure of the strength members under load, are both enhanced by suitable impregnation of the filaments. Thus, in inventive cables the strength members typically are impregnated with a material that promotes coupling to the jacket 15, that exhibits a relatively high coefficient of static friction with the material of the jacket 15, and that, furthermore, is hydrolytically stable. The impregnating material may be formed either by condensation or addition polymerization reactions and may include, for example, urethanes, acrylic acid or acrylate-based materials, epoxies, polyesters, and polyvinyl chloride or other vinyl based materials. For strength member materials such as fiberglass, a sizing such as silane must be used to protect the filament and to couple the impregnating material to the filament. For materials such as KEVLAR ® aramid fiber, a sizing may not be required. However, aramid fibers may require a coating to prevent fraying during extrusion, and to enhance coupling to the first jacket.

Fiberglass impregnation is customarily accomplished by fiberglass suppliers. Glass filaments are drawn from a furnace bushing and cooled by a water spray followed by the application of a water dispersion of silane. Drying removes excess water and alcohol, which is formed as the silane bonds to glass, and leaves a silane-coated filament with functional groups positioned to couple with a vinyl-compatible impregnating material. Each strength member is impregnated in a bath, with the sized fibers being spaced apart to enhance the impregnation. For an example of a method of impregnating a bundle of filaments, see U.S. Pat. No. 4,479,984, which issued on Oct. 30, 1984 in the names of N. Levy and P. D. Patel and which is incorporated by reference hereinto.

In a preferred embodiment, vinyl compatible, impregnated fiberglass rovings or yarns are used as strength members. The impregnating material, a urethane, couples each silane-coated filament with its neighbors and thus protects the filament against abrasion, bridges flaws, and acts to establish tensile load balance. In the preferred embodiment of the invention a combination of impregnated E-glass fibers/PVC first jacket material is used that has a pull-out strength of more than 40 lbs/in of strength member, typically about 50 lbs/in, as determined in a test that will be specified below. We consider that a thus determined pull-out strength of 25 lbs/in in many cases will correspond to the lower limit of coupling strength useful in cable according to the invention.

The pull-out test used to quantify the coupling strength corresponds substantially to a standard test method for testing the adhesion of rubber to single-strand wire, which is designated ASTMD-1871, Procedure A.

The test blocks of first jacket material, typically a thermoplastic such as PVC, are to be prepared as follows:

(a) The starting material (granules, pellets, etc.) is homogenized, a clean 6"×6"×¼" mold charged with the homogenized material, a molding pressure of 300 psi applied to the mold, the charge heated to 180° C., the temperature maintained for 2-5 minutes, and the material cooled to 70° C. at a rate of about 7.5° C./min while applying a pressure of 600 psi to the mold. After cooling to about 30° C. the molded sheet of first jacket material is removed from the mold, washed in running warm water and dried with a soft, clean cloth.

(b) The thus formed sheet is cut into two 6"×2"×¼" and three 2"×2"×¼" pieces, one large and one small piece is placed into the bottom of a mold per ASTMD-1871, Procedure A, 15 samples of the strength member to be tested are inserted in the beveled slots in the mold, and the remaining large and one small piece of the molded material are placed into the mold so as to cover the strength members.

(c) The thus prepared mold is placed in a preheated press (170°-180° C.), the temperature maintained and a pressure of 850-1150 psi applied for 2-5 minutes, then the mold cooled, at a rate of at least 22° C./min, to 70° C. while maintaining the pressure, followed by cooling to room temperature under ambient pressure.

(d) The thus prepared block assembly is then tested in accordance with method A of ASTMD-1871, using a cross head speed of 2"/min, with the following exception: slots 1 and 15 are used to set up the pull testing equipment, and their pull-out values are not used. Of the remaining 13 slots, twelve are pulled, the 13th to be used as a spare if needed. Of the twelve pull-out values obtained, the highest and lowest are discarded and the remaining 10 are averaged. The thus obtained value, after normalization, corresponds to the "pull-out strength", as the term is used herein.

A significant aspect of preferred embodiments of the invention is the number and placement of strength members 16. In particular, we have found that the use of three strength members, (or three groups of strength members) offers advantages that we consider unobtainable with any other number of strength members (or groups of strength members). For reasons of, inter alia, simplicity of manufacture, we currently most prefer cables containing three strength members only. The following remarks are intended to apply, however, in analogous fashion also to cable containing three groups of strength members, each containing two or more strength members. Among the above referred to advantages are the resulting flexibility of the cable structure, and maintenance of the fibers in a relatively stress-free condition even for bend radii as small as one inch. The three strength members are arranged symmetrically with respect to the first jacket axis, i.e., such that the centers of the strength members (having radii $r_s$) are substantially located on the circumference of an imaginary circle (of radius R) centered on the first jacket axis, with the strength members disposed substantially symmetrically (i.e., spaced 120° apart) on this circumference. Furthermore, in preferred embodiments the radius R of the above referred to imaginary circle bears a predetermined relationship to the inner radius (r) of the first jacket. In particular, $R > (r+r_s)/\cos 30°$, i.e., $R > 1.155(r+r_s)$. If this condition is met then, regardless of the direction in which a cable according to the invention is bent, it typically will arrange itself such that two of the strength members are in tension and the remaining strength member is in compression, with essentially no stress resulting on the core member, thereby avoiding the deformation of the fiber-containing cavity at the center of the cable. Furthermore, the neutral axis of the bent cable will go through the fiber-containing cavity, thereby permitting the fibers to move such as to be always on, or close to, the neutral axis.

Although in currently preferred embodiments of the inventive cable the fibers within the core member and the strength members are to be substantially layless (i.e., not stranded), and the strength members are also substantially untwisted, these conditions are not requirements, and we envisage at least under some circumstances the use of twisted strength members, and/or slightly stranded strength members and/or optical fibers.

In preferred embodiments of the inventive cable, the fibers contained in the core are overstuffed. By this we mean that, for any length of cable, the length of any one of the fibers contained within the core wrap is greater than the length of the cable. As will be appreciated by those skilled in the art, the amount of overstuffing should be selected such that, for any given cable design, the cable strain under maximum permissible tensile load results in less than maximum permissible fiber strain. A further consideration in the selection of the desired degree of overstuff is the introduction of microbending loss due to fiber undulation. Fiber undulation is the natural consequence of overstuffing, with the undulatory wavelength decreasing with increasing overstuffing. Since susceptibility to microbending loss is a function of fiber design, no general upper limit of permissible overstuffing can be given. However, at least for one commercially available fiber, it was determined that 0.5% overstuffing does not lead to unacceptable microbending loss.

A further microbending-related consideration is the choice of core member diameter or, more precisely, the diameter of the volume available to the fibers within the core. In particular, choice of a small core member diameter results in relatively short undulation length, which in turn may result in increased microbending loss, as compared to microbending loss observed in cables with larger core diameter.

Although FIG. 1 shows a cable with two optical fibers in the core, it will be appreciated that the same cable design can be used with one optical fiber, or with any desired number of optical fibers greater than one, limited only by the number of fibers that can be fit into the available space without introducing unacceptable loss, while still permitting the fibers to accommodate to applied stress. For instance, for distribution and building riser cable applications, it may be desirable to have a larger number of fibers present, possibly 4, 8 or 10 fibers. On the other hand, for use as service lightguide or on customer premises, a single fiber, e.g., one single mode fiber, is expected to be sufficient in many cases. It will also be understood that although FIG. 1 shows buffered fibers, this is not required and unbuffered fibers, i.e., fibers carrying only the usual polymer coating, can also be used. Furthermore, although FIG. 1 shows a cable with a filled core, core filling is not a requirement, and unfilled cable according to the invention can be used, for instance, in building applications, such as riser cable or plenum.

Cable of the type shown in FIG. 1 can advantageously be used in building applications, be buried directly, or placed into conduits. It is a dielectric structure and therefore immune to lightning strike. On the other hand, it is not protected against rodents or digging equipment.

Figure 2:
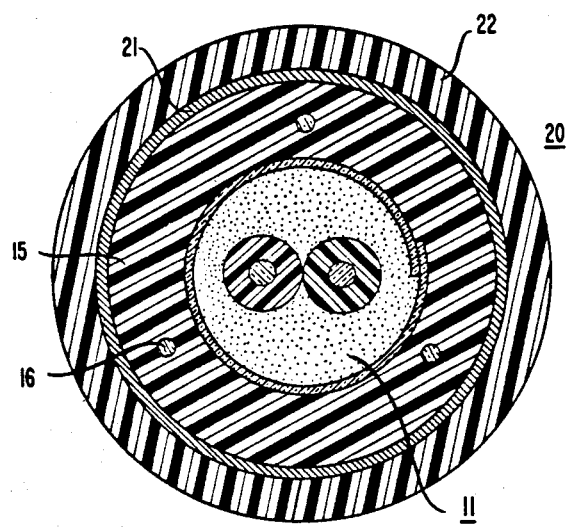

FIG. 2 shows an embodiment of the invention that is protected against mechanical damage, and thus can be used in applications where the previously described embodiment may not be appropriate. The armored cable 20 comprises fibers, a core member, a jacket, and a multiplicity of strength members, all as described above. In addition, cable 20 comprises metallic armor 21 and outer jacket 22. The armor can be one of several known types of armor. In particular, it can be either a longitudinally applied stainless steel or copper clad stainless steel corrugated tape that is applied overlappingly, or it can be helically applied stainless steel or copper clad stainless steel tape, also applied overlappingly. The former is suitable in cases where protection against damage from digging equipment is required, whereas the latter also provides protection against rodent attack. The outer jacket 22 typically comprises polymer material such as PVC, polyethylene, or polypropylene, with PVC being currently preferred.

In preferred embodiments, the armor and outer jacket are applied such that the outer jacket is frictionally coupled to the armor, and the armor in turn is frictionally coupled to the first jacket 15. This can be achieved by known methods. For instance, substantial frictional coupling of the outer jacket to the armor can be achieved by pressure extrusion of the outer jacket material.

What is claimed is:

1. A communications transmission cable comprising
   (a) a core member having a longitudinal axis and comprising at least one optical fiber and first means surrounding the fiber;
   (b) a first jacket having a longitudinal axis and an inner and an outer surface and comprising a polymeric material, the first jacket enclosing the core member and being substantially coaxial with the core member; and
   (c) three groups of non-metallic strength members, disposed between the inner and the outer first jacket surfaces in a generally longitudinal direction, each group of strength members comprising one or more strength members and having a longitudinal axis, the longitudinal axis of each group of strength members being a distance R from the first jacket longitudinal axis and being spaced substantially 120° from the longitudinal axis of each of the remaining two groups, with $R > 1.155(r + r_s)$, each strength member comprising a plurality of filaments that are gathered together, and each strength member being coupled to the first jacket.

2. The cable of claim 1, wherein each group of strength members consists of one strength member, and wherein the coupling of the strength member to the first jacket is characterized by a pull-out strength of at least 25 lbs/in of strength member.

3. The cable of claim 2, wherein each strength member comprises a plurality of filaments that are impregnated with a coupling-promoting material.

4. The cable of claim 3, wherein the coupling-promoting material is chosen from the group consisting of urethanes, acrylic acid, acrylate-based materials, epoxies, polyesters, and vinyl-based materials.

5. The cable of claim 4, wherein the filaments comprise borosilicate glass, and wherein the coupling-promoting material is a urethane.

6. The cable of claim 2, wherein the optical fiber is overstuffed, i.e., for any length $l_c$ of the cable, $l_g > l_c$, where $l_g$ is the length of the at least one optical fiber contained in the length $l_c$ of cable.

7. The cable of claim 2, wherein the at least one optical fiber comprises a glass member, at least one polymer coating surrounding the glass member, and a buffer layer surrounding the polymer coating.

8. The cable of claim 2, wherein the first means comprise a woven, polymer-coated fiberglass tape.

9. The cable of claim 2, wherein the strength members comprise impregnated fiberglass roving, and wherein the first jacket comprises polyvinyl chloride.

10. The cable of claim 2, wherein the first means surround the optical fiber so as to leave voids between the optical fiber and the first means, and wherein filling compound means at least partially fill the voids.

11. The cable of claim 2, further comprising a metal member and an outer jacket, the metal member surrounding the first jacket, and the outer jacket surrounding the metal member, the outer jacket comprising a plastic material.

12. The cable of claim 11, wherein the metal member comprises a metal tape that is helically and overlappingly wrapped over the first jacket.

13. The cable of claim 11, wherein the metal member comprises a corrugated metal tape that is longitudinally and overlappingly wrapped over the first jacket.

14. The cable of claim 2, wherein the core member comprises at least two optical fibers.

15. A communications transmission cable comprising
(a) a core member having a longitudinal axis and comprising at least one optical fiber and a core wrap surrounding the at least one optical fiber, the core wrap comprising a woven, polymer-coated fiberglass tape that is longitudinally wrapped over the optical fiber, leaving voids between the core wrap and the optical fiber;

(b) a first jacket having a longitudinal axis and an inner and an outer surface and comprising polyvinyl chloride, the first jacket being substantially coaxial with the core member and contactingly surrounding the core member, the first jacket having substantially circular cross section, with distance r from the first jacket longitudinal axis to the first jacket inner surface; and (c) three non-metallic strength members, each strength member having an axis and a radius $r_s$, the strength members disposed between the inner and outer first jacket surfaces in generally longitudinal direction, the strength member axes being a distance R from the first jacket axis, where $R > 1.155(r + r_s)$, the strength member axes located 120° apart, each strength member comprising a plurality of filaments that are impregnated with a coupling-promoting material and that are gathered together, each strength member being coupled to the first jacket, the coupling characterized by a pull-out strength of at least 40 lbs/in of strength member.

16. The cable of claim 15, further comprising
(d) a metal tape contactingly surrounding the first jacket; and
(e) an outer jacket contactingly surrounding the metal tape, the outer jacket comprising polyvinyl chloride.

17. The cable of claim 15, wherein the core member further comprises a fire-retardant material comprising fumed silica and chlorinated paraffin oil, the material substantially filling the voids between the at least one optical fiber and the core wrap.

* * * * *